Oct. 15, 1968   D. SCARAMUCCI   3,405,908
SELF-ALIGNING BALL VALVE
Filed Sept. 16, 1965   2 Sheets-Sheet 1
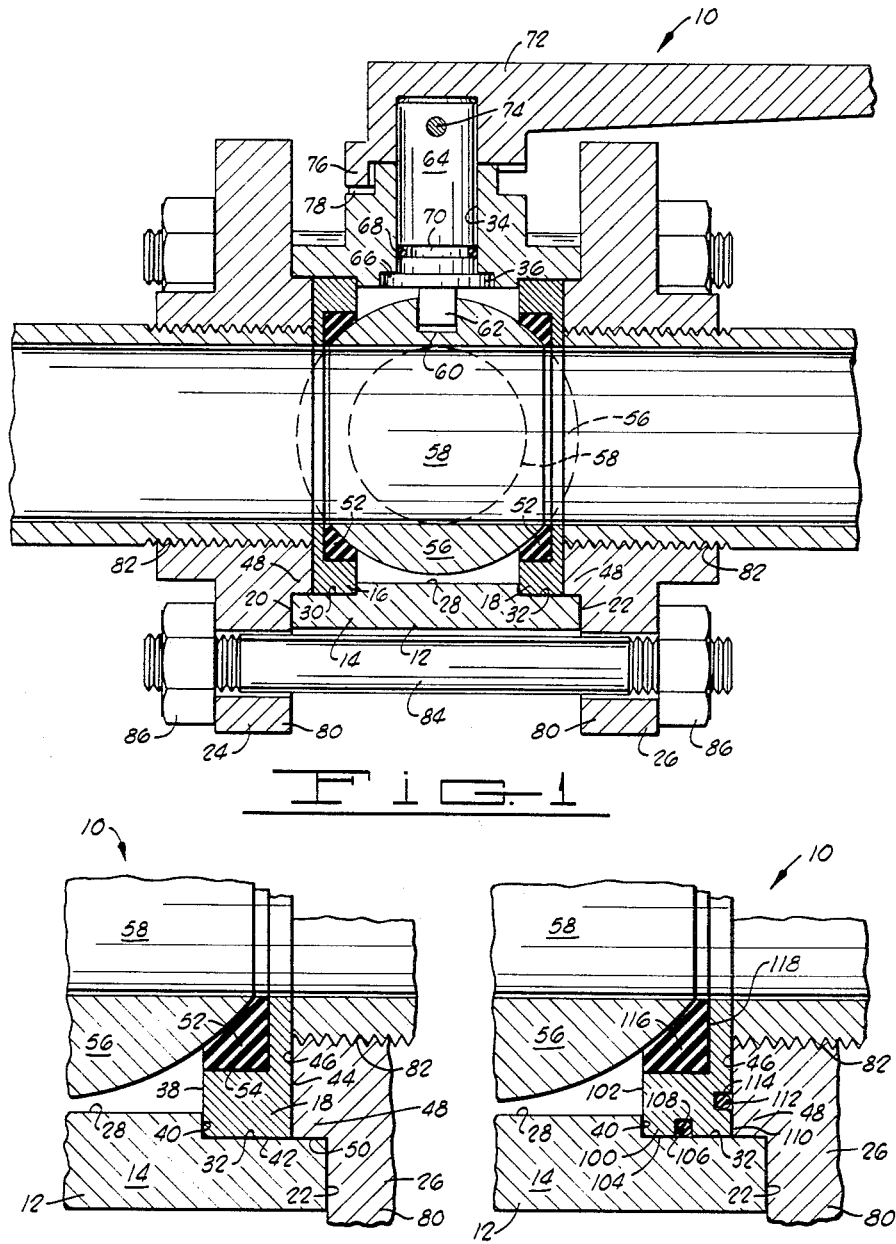
INVENTOR.
DOMER SCARAMUCCI
BY
Dunlap and Laney
ATTORNEYS

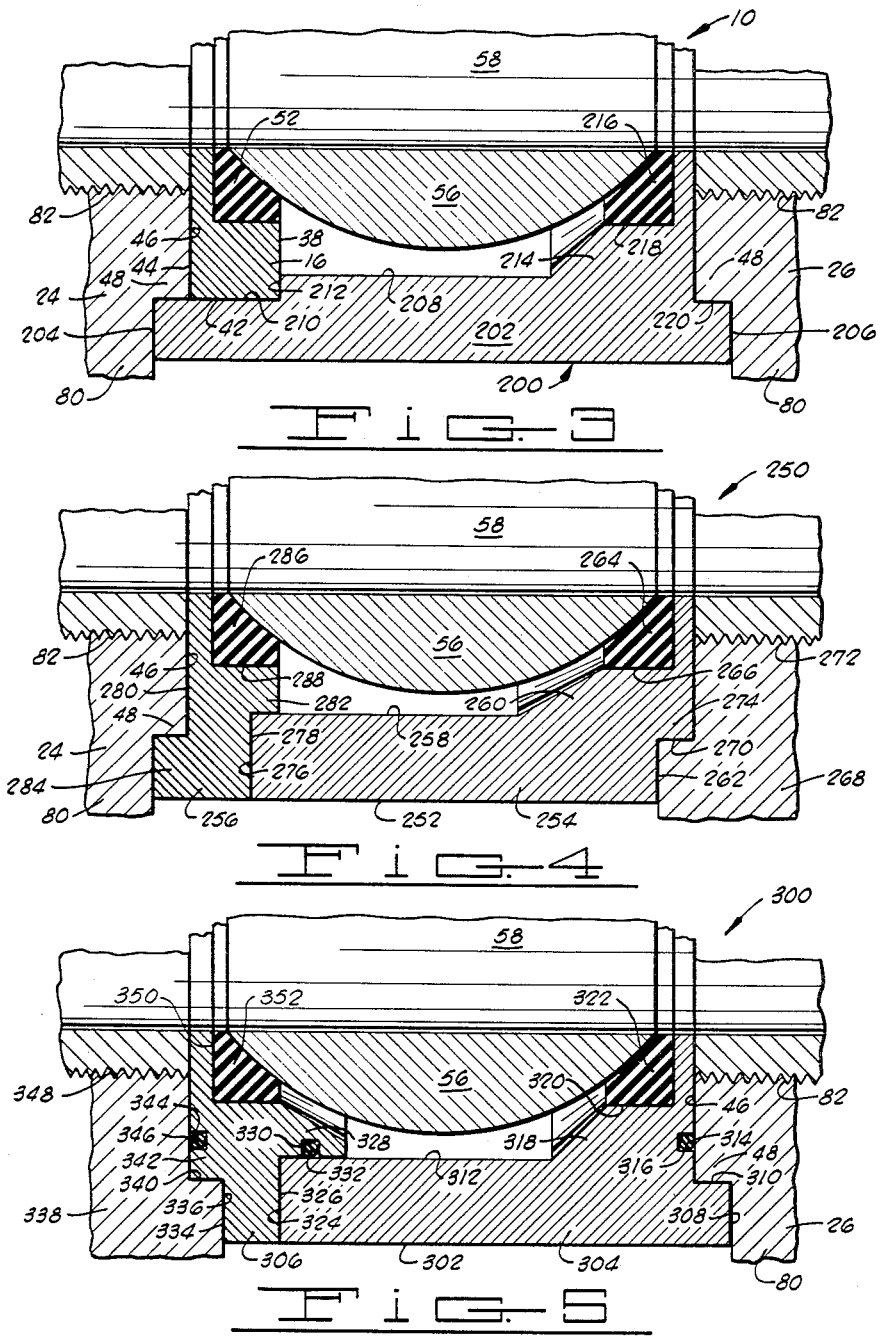

United States Patent Office 3,405,908
Patented Oct. 15, 1968

3,405,908
SELF-ALIGNING BALL VALVE
Domer Scaramucci, Oklahoma City, Okla., assignor to Balon Corporation, Oklahoma City, Okla., a corporation of Oklahoma
Filed Sept. 16, 1965, Ser. No. 487,682
6 Claims. (Cl. 251—148)

ABSTRACT OF THE DISCLOSURE

A valve which includes a valve body and a pair of bolt-interconnected connecting members disposed on opposite sides of the valve body and having openings therethrough aligned with a passageway through the body. The connecting members are also provided with an annular surface which extends axially with respect to the passageway through the body. The annular surface of each connecting member is on a side thereof adjacent the valve body and bears against a mating annular surface which extends axially from either the valve body, or from a seal ring which is radially interlocked with the valve body. The mating annular surface extends concentrically with respect to the first-described annular surface along an area of contact such that radial interlocking is effected between the body and connecting members to assure proper alignment between the openings in the connecting members and the passageway through the valve body. A valve member is positioned in the body for opening and closing the valve.

---

This invention relates generally to an improved self-aligning ball valve. More particularly, but not by way of limitation, this invention relates to an improved ball valve wherein the passageway through the ball valve body and through a pair of flanged connecting members assembled with the body are aligned automatically upon assembly of the ball valve body with the flanged connecting members.

Difficulty has been encountered in ball valves mounted between flanges in the past, due, at least in part, to the irregular flow passageway therethrough resulting from misalignment of the passageway in the valve body with the openings extending through the flanged connecting members. Misalignment may occur since the valve body, which is positioned between the flanged connecting members, is held in position only by the compressive force exerted by the flanges thereon. Most often, a planar end face on the flanged connecting members is positioned in abutting relation with the planar end faces of the valve body with no provision being made for positively aligning the opening in the flanged connecting members with the passageway through the valve body.

When the valve ball or valve closure member and the flow port extending therethrough are constructed as large as possible and the body kept as short (between the end faces) as possible to save weight and manufacturing cost, the misalignment of the passageway through the valve body and the openings in the flanged connecting members becomes more acute. When the valve is constructed as stated, portions of the valve ball actually enter the openings in the flanged connecting members when the valve ball is rotated to a closed position. Manifestly, the openings in the flanged connecting members must be in alignment with the passageway through the valve body or interference between the valve ball and the flanged connecting members may occur during rotation of the valve ball.

Furthermore, it is also highly desirable in the construction of such a valve, to arrange the valve body whereby the flanged connecting members exert a pure compressive force on the valve body when assembled therewith. If a pure compressive force is attained, the wall thickness of the valve body can be reduced considerably whereby a larger valve ball having an optimum flow area (port diameter) therethrough can be provided.

Most ball valves constructed in the past for use between flanged connecting members have included a pair of seal or seat rings located adjacent the end faces of the valve body in engagement with the end faces of the connecting members. In many instances, the arrangement of the seal rings is such that they exert a force on the valve body, when the connecting members are assembled with the valve body, that tends to deform the valve body mechanically. Therefore, valve bodies constructed in the past for such valves have had a greater wall thickness than is necessary to accommodate the force generated by fluid pressure in the valve.

This invention provides a ball valve including valve body means having first and second end faces and an axial passageway extending therethrough intersecting the end faces, the body means includes a body member having first and second ends and an opening extending transversely therethrough intersecting the passageway, and a seal ring encircling the passageway in engagement with the first end of the valve body member and having a seal portion thereon; a valve ball having a flow port extending therethrough disposed in the passageway in sealing engagement with the seal portion, the valve ball being rotatable in the passageway from an open position; operating means extending through the transverse opening in the valve body into engagement with the valve ball for rotating the valve ball; a first flanged connecting member having an opening extending therethrough, the first flanged connecting member including an end face engaging the first end face of the valve body means to align the opening therein with the passageway; a second flanged connecting member having an opening extending therethrough, the second flanged connecting member having an end face engaging the second end face on the valve body means to align the opening therein with the passageway; and, connecting means extending between the flanged connecting members exerting a compressive force on the connecting members and valve body means, thereby retaining the connecting members and valve body assembled with the passageway and openings aligned.

One object of this invention is to provide an improved ball valve for use between flanged connecting members wherein the flanged connecting members engage the valve body to align a passageway in the valve body with the openings extending through the flanged connecting members.

Another object of this invention is to provide an improved ball valve for use between flanged connecting members that effectively eliminates forces tending to distort the valve body when the valve body is assembled with the connecting members.

A further object of this invention is to provide an improved ball valve having an optimum flow area.

Still another object of this invention is to provide an improved ball valve for use between a pair of flanged connecting members that is self-aligning, that effectively eliminates forces tending to distort the valve body, and that has a flow port therein of optimum size.

The foregoing and additional objects and advantages of the invention will become more apparents as the following detailed description is read in conjunction with the accompanying drawings wherein like reference characters denote like parts in all views and wherein:

FIG. 1 is a vertical cross-sectional view of a ball valve constructed in accordance with the invention;

FIG. 1A is an enlarged fragmentary cross-sectional view of a portion of the ball valve of FIG. 1;

FIG. 2 is an enlarged fragmentary cross-sectional view of a portion of the ball valve of FIG. 1 illustrating another embodiment of seal ring also constructed in accordance with the invention;

FIG. 3 is a fragmentary cross-sectional view illustrating another embodiment of valve body located in the ball valve of FIG. 1 and also constructed in accordance with the invention;

FIG. 4 is a fragmentary cross-sectional view similar to FIG. 2 but, illustrating still another embodiment of ball valve constructed in accordance with the invention; and, FIG. 5 is a fragmentary cross-sectional view similar to FIG. 4, but illustrating another embodiment of ball valve also constructed in accordance with the invention.

*Embodiment of FIG. 1*

FIG. 1 illustrates a ball valve generally designated by the reference character 10 and constructed in accordance with the invention. As shown therein, the ball valve 10 includes a valve body 12 consisting of a body member 14 and a pair of seal rings 16 and 18.

The body member 14 includes end faces 20 and 22 that are in engagement with flanged connecting members 24 and 26, respectively. The valve body 12 includes a passageway 28 extending therethrough and intersecting the end faces 20 and 22 and having counterbores 30 and 32 formed coaxially with the passageway 28 adjacent the end faces 20 and 22, respectively. A transverse opening 34 extends through the body member 14 intersecting the passageway 28 and having a counterbore formed at the intersection therebetween providing a downwardly facing surface 36 therein.

The seal rings 16 and 18 are identically constructed although oppositely disposed in the body member 14. Since the seal rings 16 and 18 are identically constructed, only the seal ring 18 will be described in detail, it being understood that the seal ring 16 includes like parts that are designated by the same reference characters.

FIG. 1A illustrates the structure of the seal ring 18 in more detail. As shown therein, the seal ring 18 includes an end face 38 that is in engagement with a shoulder 40 formed in the body member 14 by the counterbore 32. An outer periphery 42 on the seal ring 18 engages the body member 14 in the counterbore 32. A second end face 44 on the seal ring 18 is in engagement with an end face 46 of an axial flange 48 on the flanged connecting member 26. As clearly shown in FIG. 1A, the periphery 50 of the axial flange 48 is disposed in the counterbore 32 in engagement with the valve body 14.

A resilient annular seal member 52 is disposed in an annular groove 54 formed in the seal ring 18. The seal member 52 has a surface thereon in sealing engagement with the exterior surface of a valve ball 56.

The valve ball 56 (shown more clearly in FIG. 1) is disposed in the passageway 28 extending through the body member 14 and includes a flow port 58 that extends therethrough. The valve ball 56 also includes a rectangular recess 60 (see FIG. 1) formed in the exterior thereof that is sized to receive a rectangular lower end 62 of a valve operating member 64.

The valve operating member 64 extends through the transverse opening 34 in the body member 14 and includes an exterior flange 66 that engages the surface 36 in the body member 14 to limit the upward movement of the valve operating member 64 therein.

An O-ring seal 68 is disposed in an annular groove 70 in the valve operating member 64. The O-ring seal 68 sealingly engages the body member 14 in the transverse opening 34 and the valve operating member 64.

The end of the valve operating member 64 extending from the body member 14 is connected with a valve operating handle 72 by a pin 74. The handle 72 includes a lug 76 that is arranged to engage spaced abutments 78 formed on the body member 14 to limit the rotational movement of the handle 72 to approximately 90 degrees.

As illustrated in FIG. 1, the flow port 58 in the valve ball 56 is aligned with the passageway 28 so that the valve 10 is in the open position. When the operating handle 72 is rotated 90 degrees, the valve operating member 64 and valve ball 56 are also rotated 90 degrees moving the flow port 58 in the valve ball until it is disposed at a right angle relative to the passageway 28 and thereby placing the valve 10 in the closed position as shown in dash lines in FIG. 1.

The flanged connecting members 24 and 26, in addition to the axial flanges 48, also include an exterior flange 80 and a threaded opening 82 extending therethrough. When assembled, and as will be described more fully hereinafter, the threaded openings 82 are in axial alignment with the passageway 28 in the body member 14 and the flow port 58 in the valve ball 56.

A plurality of threaded fasteners 84 extend through the flanges 80 on the flanged connecting members 24 and 26. A threaded nut 86 is connected with each end of the threaded fasteners 84 so that rotation of the nuts 86, in the proper direction, moves the flanged connecting members 24 and 26 relatively together to hold the valve 10 assembled.

In assembling the valve 10, the operating member 64 and valve ball 56 are placed in the body member 14 and then the seal rings 16 and 18 placed in the counterbores 30 and 32, respectively. The flanged connecting members 24 and 26 are then assembled with the body member 14 by placing the axial flanges 48 thereon in the counterbores 30 and 32. The threaded fasteners 84 are inserted in the flanges 80 of the flanged connecting members 24 and 26 and the nuts 86 placed thereon and tightened so that the end faces 38 of the seal rings 16 and 18 engage the shoulders 40 (see FIG. 1A) in the body member 14 and the flanges 80 on the flanged connecting members 24 and 26 engage the end faces 20 and 22 of the body member 14. It can be appreciated from viewing FIG. 1 that the passageway 28, the flow port 58 and the threaded openings 82 are held in alignment due to the disposition of the axial flanges 48 in the counterbores 30 and 32 of the body member 14.

Furthermore, it can be appreciated that the load exerted on the body member 14 by the flanged connecting members 24 and 26 as the threaded nuts 86 are tightened on the threaded fasteners 84 is a pure compressive load on the body member 14 due to the engagement of the end faces 20 and 22 thereof with the connecting members 24 and 26. The arrangement described avoids any forces other than the pure compressive force on the body member 14. Thus, the wall thickness of the body member 14 can be reduced to the minimum required to withstand the pressure forces developed within the passageway 28 by the fluid in the valve 10. Reducing the wall thickness of the body member 14 to the minimum permits the construction of the valve ball 56 with a maximum outside diameter, which in turn, permits the flow port 58 to be made relatively large providing the optimum flow area through the valve 10.

The importance of accurately aligning the threaded openings 82 in the connecting members 24 and 26 with the passageway 28 can be readily appreciated when it is realized that the exterior surface of the valve ball 58, when rotated to the closed position, extends into the threaded openings 82 as shown in dash lines in FIG. 1. Therefore, the accurate alignment of the connecting members 24 and 26 with the body member 14 provides the advantage of permitting the valve ball to be constructed as large as possible to provide the optimum flow area through the valve and at the same time avoid forces on the valve body that tend to deform the valve body mechanically. Thus, the wall thickness of the body member 14 can be reduced to the minimum thickness.

Embodiment of FIG. 2

FIG. 2 illustrates a modified form of the seal rings 16 and 18 that is designated in FIG. 2 by the reference character 100. As shown therein, the seal ring 100 is located in the valve 10 in lieu of the seal rings 16 and 18.

The seal ring 100 includes an end face 102 engaging the shoulder 40 formed in the body member 14 and an outer peripheral portion 104 disposed in the counterbore 32 in engagement with the body member 14. An O-ring seal 106 is disposed in an annular groove 108 formed in the peripheral portion 104 of the seal ring 100. The O-ring seal 106 sealingly engages the seal ring 100 and the body member 14 to prevent the escape of fluid from the passageway 28 between the seal ring 100 and the body member 14.

A second end face 110 on the seal ring 100 engages the end face 46 of the axial flange 48 on the flanged connecting member 26. An O-ring seal 112 is disposed in an annular groove 114 that is formed in the end face 110. The O-ring seal 112 sealingly engages the seal ring 100 and the connecting member 26 to prevent the escape of fluid between the seal ring 100 and the flanged connecting member 26.

A resilient annular seal member 116 is disposed in an annular groove 118 formed in the seal ring 100. The seal member 116 has a surface thereon sealingly engaging the exterior of the valve ball 56.

It can be perceived from viewing FIG. 2 that the seal ring 100 provides the same advantages previously mentioned in connection with the seal rings 16 and 18 and, in addition, incorporates the O-ring seals 106 and 112 to further aid in preventing the escape of fluid from within the valve 10 to the exterior thereof between the flanged connecting member 26 and the body member 14.

Embodiment of FIG. 3

The fragmentary cross-sectional view of FIG. 3 illustrates another embodiment of valve body generally designated by the reference character 200 constructed in accordance with the invention and located in the valve 10. As illustrated in FIG. 3, the valve body 200 includes a valve body member 202 having end faces 204 and 206 engaging the flanges 80 on the flanged connecting members 24 and 26.

The valve body member 202 also includes a passageway 208 and a counterbore 210 formed in the valve body member 202 adjacent the end face 204. The counterbore 210 forms a shoulder 212 that engages the end face 38 of the seal ring 16. The outer periphery 42 of the seal ring 16 is in engagement with the valve body member 202 in the counterbore 210.

The valve body 200 includes an inwardly projecting flange portion 214. A resilient annular seal member 216 is disposed in a recess 218 formed in the flange portion 214. A surface of the seal member 216 is in sealing engagement with the exterior surface of the ball valve 56.

A counterbore 220 is formed in the end face 206 of the valve member 202 coaxially with the passageway 208 extending therethrough. The counterbore 220 is sized to receive the axial flange 48 of the flanged connecting member 26.

The seal ring 16, which is disposed in the counterbore 210, has the end face 44 thereon engaging the end face 46 of the flanged connecting member 24. As clearly shown in FIG. 3, the axial flange 48 on the flanged connecting member 24 extends into the counterbore 210.

From the foregoing, it can be appreciated that the valve 10 when provided with the valve body 200 provides the advantages described in connection with the embodiment of FIG. 1. For example, the opening 82 extending through the flanged connecting member 26 is aligned with the passageway 208 in the valve member 202 due to the engagement of the axial flange 48 of the connecting member 26 with the counterbore 220 in the end face 206 of the valve body member 202. Also, the seal ring 16 and the opening 82 in the flanged connecting member 24 are aligned with the passageway 208 in the valve body 202 due to the engagement of the outer periphery 42 of the seal ring 16 in the counterbore 210 of the body member 202 and due to the engagement of the axial flange 48 on the connecting member 24, with the body member 202 in the counterbore 210.

It can also be appreciated that the force exerted by the flanged connecting members 24 and 26, as the threaded fasteners 84 (see FIG. 1) are tightened, is exerted on the valve body member 202 as a compressive force thereby effectively eliminating forces tending to deform the valve body mechanically and permitting the reduction in the wall thickness of the valve body member 202 whereby the valve body member 202 can accommodate the larger valve ball 56. As previously mentioned, the larger valve ball 56 is provided with the flow port 58 therein of maximum size to provide the optimum flow area through the valve 10.

Embodiment of FIG. 4

The fragmentary cross-sectional view of FIG. 4 illustrates another embodiment of ball valve generally designated by the reference character 250 and also constructed in accordance with the invention. The ball valve 250 includes a valve body 252 comprising a body member 254 and a seal ring 256.

The body member 254 has a passageway 258 extending therethrough and an inwardly projecting flange 260 adjacent an end face 262 thereon. As may be perceived in FIG. 4, a resilient annular seal 264 is disposed in an annular recess 266 encircling the passageway 258 in the flange portion 260.

The end face 262 is in engagement with a flanged connecting member 268. The flanged connecting member 268 is of the female type, that is, it includes a counterbore 270 encircling a threaded opening 272 that extends therethrough.

The counterbore 270 is sized to receive an axial flange 274 formed on the end face 262 of the body member 254. The axial flange 274 has an outside diameter sized to engage the flanged connecting member 268 in the counterbore 270 to align the passageway 258 with the opening 272.

The valve body member 254 also includes an end face 276 that is in engagement with a shoulder 278 formed on the seal ring 256. The opposing end face 280 of the seal ring 256 is in engagement with the end face 46 of the flanged connecting member 24 previously described in connection with FIG. 1.

A first axial flange 282 on the seal ring 256 projects therefrom into the passageway 258. The outer diameter of the axial flange 282 is sized to engage the body member 254 in the passageway 258.

A second axial flange 284 projects from the end face 280 of the seal ring 256 and has an inner diameter sized to engage the axial flange 48 of the flanged connecting member 24. As shown in FIG. 4, the engagement of the axial flange 48 with the axial flange 284 and the engagement of the axial flange 282 with the valve body 254 automatically aligns the opening 82 in the flanged connecting member 24 with the passageway 258 in the body member 254 when the valve 250 is assembled.

A resilient annular seal member 286 is located in an annular recess 288 in the seal ring 256. The seal member 286 has a surface thereon sealingly engaging the valve ball 56.

As previously mentioned, the axial flange 274 on the body member 254 cooperates with the counterbore 270 in the flanged connected member 268 to axially align the opening 272 with the passageway 258 and the axial flanges 282 and 284 on the seal ring 256 cooperate with the valve body member 254 and the flanged connecting member 24 to axially align the opening 82 extending through the connecting member 24 with the passageway 258.

Furthermore, the engagement of the shoulder 278 with the full end face 276 of the body member 254, transmits the force exerted when tightening the threaded fasteners 84 (see FIG. 1) as a direct compressive force on the body member 254. Thus, distorting forces that are usually present in between-flange-valves are effectively eliminated. As a result, the wall thickness of the body member 254 can be reduced, providing room in the passageway 258 for a larger diameter ball valve 56. Since a larger valve ball 56 can be utilized, the flow port 58 therein can be increased to provide the optimum flow area through the valve 250.

Embodiment of FIG. 5

The fragmentary cross-sectional view of FIG. 5 illustrates still another embodiment of ball valve generally designated by the reference character 300 and also constructed in accordance with the invention. As shown therein, the ball valve 300 includes a valve body 302 including a valve body member 304 and a seal ring 306.

The valve body 304 has an end face 308 that is in engagement with the flanged connecting member 26 previously described in connection with FIG. 1. A counterbore 310 is formed in the end face 308 to receive the flange portion 48 of the flanged connecting member 26. The counterbore 310 is sized so that the axial flange portion 48 of the connecting member 26 engages the valve body member 304 in the counterbore 310 to align the opening 82 extending therethrough with a passageway 312 that extends through the valve body member 304.

An O-ring seal 314 is disposed in an annular groove 316 formed in the end face 308 of the body member 304. The O-ring seal 314 sealingly engages the body member 304 and the end face 46 of the connecting member 26 thereby preventing the flow of fluid therebetween.

The body member 304 also includes an inwardly projecting flange portion 318 having an annular groove 320 formed therein encircling the passageway 312. A resilient annular seal member 322 is disposed in the annular groove 320 and has a surface thereon sealingly engaging the exterior surface of the valve ball 56.

A second end face 324 on the body member 304 fully engages a shoulder 326 formed on the seal ring 306. The seal ring 306 includes an axial flange 328 extending therefrom into the passageway 312. The outer diameter of the axial flange 328 is sized to engage the valve body member 304 in the passageway 312 and includes an annular groove 330. An O-ring seal 332 is disposed in the annular groove 330 in sealing engagement with the seal ring 306 and with the valve body member 304.

The seal ring 306 also includes an end face 334 that is in engagement with an end face 336 on a flanged connecting member 338. The flanged connecting member 338 is of the female type, that is, it has a counterbore 340 formed in the end face 336 that is sized to receive a second axial flange 342 projecting from the second end face 334 of the seal ring 306.

An annular groove 344 is formed in the seal ring 306 adjacent the flanged connecting member 338 and has an O-ring seal 346 disposed therein in sealing engagement with the flanged connecting member 338 and the seal ring 306. It should be pointed out that the outside diameter of the annular groove 344 does not exceed the diameter of the passageway 312.

The seal ring 306 also includes an annular groove 350 having a resilient annular seal member 352 disposed therein. The seal member 352 has a surface thereon sealingly engaging the exterior surface of the valve ball 56.

With the axial flange 342 of the seal ring 306 disposed in the counterbore 340 of the flanged connecting member 338 and the axial flange 328 on the seal ring 306 disposed in the passageway 312, an opening 348 extending through the flanged connecting member 338 is aligned with the passageway 312 in the valve body member 304. When assembled, the opening 348, the passageway 312 and the opening 82 are axially aligned as previously described. Furthermore, the engagement of the end face 334 of the seal ring 306 with the end face 336 of the flanged connecting member 338 and the engagement of the shoulder 26 of the seal ring 306 with the end face 324 of the body member 304 and the engagement of the end face 308 with the end face 46 of the flanged connecting member 26 provides for the transmission of the load exerted by tightening the threaded fasteners 84 (see FIG. 1) in the compression on the valve body member 304. Thus, forces tending to distort the valve body 304 are eliminated whereby the wall thickness thereof can be reduced to accommodate the larger diameter of the valve ball 56. As previously pointed out, when the larger diameter valve ball 56 is used, the flow port 58 extending therethrough can also be increased in size to provide the maximum or optimum flow area through the valve 300.

In each of the embodiments of the valve described in detail hereinbefore, the structure provided maintains the passageway through the valve, the position of the seal rings and the openings extending through the flanged connecting members in alignment when they are assembled. Furthermore, each of the valve structures described also provides for the elimination of distorting forces whereby the wall thickness of the valve body can be reduced to only the thickness required to hold the fluid pressure force exerted from within the valve. With the reduced wall thickness of the valve body, a larger diameter ball and, consequently, a larger flow port is provided, whereby the valves have an optimum flow area therethrough.

It will be understood that the embodiments described in detail herein are presented by way of example only and that many changes and modifications can be made thereto without departing from the spirit of the invention or from the scope of the annexed claims.

What I claim is:
1. A ball valve comprising:
valve body means having first and second end faces, and an axial passageway extending therethrough intersecting said end faces, and a surface adjacent each of said end faces arranged coaxially with respect to said pasasgeway, said valve body means including
a body member having first and second end faces and first and second end portions adjacent the respective end faces thereof, said body member further having an opening extending transversely therethrough intersecting said passageway, and
a one piece seal ring encircling said passageway and in engagement with the first end portion of said body member, said seal ring comprising:
a first end face engaging the entire first end face of said body member;
an axial flange projecting from the first end face of said seal ring into the passageway in said body member, said axial flange engaging said body member in said passageway; and
a second end face; and
a second axial flange projecting from the second end face of said seal ring and encircling said passageway;
a seal portion on said seal ring;
a valve ball having a port extending therethrough disposed in said passageway in sealing engagement with said seal portion, said valve ball being rotatable in said passageway from a position aligning said port and passageway to a position wherein said port is disposed at a right angle relative to said passageway;
an operating member extending through said transverse opening into engagement with said valve ball for rotating said valve ball;

first flanged connecting means having an opening extending therethrough and having a counterbore therein adjacent said last-mentioned opening receiving said second axial flange of said one piece seal ring thereby holding said first flanged connecting means, seal ring and body member assembled with said opening and passageway in alignment, said first flanged connecting means having an end face engaging the first end face of said valve body means;

second flanged connecting means having an opening extending therethrough, said second flanged connecting means having an end face engaging the second end face on said valve body means and having a surface thereon adjacent the end face thereof coaxially arranged with respect to said last-mentioned opening engaging the surface adjacent the second end face of said valve body means to align the opening therein with said passageway; and fastener means extending between said first and second flanged connecting means exerting a compressive force on said connecting means and valve body means, thereby retaining said first and second flanged connecting means and valve body means assembled with the openings in said connecting means aligned with said passageway.

2. The ball valve of claim 1 wherein said seal portion comprises a resilient annular seal member carried by said seal ring.

3. The ball valve of claim 1 and also including
an annular resilient seal disposed in an annular groove located in the second end face of said seal ring, said seal sealingly engaging said seal ring and the end face of said first flanged connecting means;
a second annular resilient seal disposed in an annular groove located in the second end face of said body member and encircling said passageway, said second annular resilient seal sealingly engaging said body member and end face of said second flanged connecting means; and,
a third annular resilient seal disposed in an annular groove in the axial flange projecting from the first end face of said seal ring, said third annular resilient seal sealingly engaging said seal ring and the body member in said passageway.

4. The ball valve of claim 3 wherein
said second end face of said body member has a counterbore therein encircling said passageway; and, wherein
the end face of said second flanged connecting means includes an axial flange encircling the opening therein, said flange engaging said body member in said counterbore to hold said body member and second flanged connecting means assembled with said passageway and opening aligned.

5. A ball valve comprising:
valve body means having first and second end faces, an axial passageway extending therethrough intersecting said end faces, and a surface adjacent each of said end faces arranged coaxially with respect to said passageway, said valve body means including
a body member having first and second end faces and first and second end portions adjacent the respective end faces thereof, said body member further having an opening extending transversely therethrough intersecting said passageway,
a one piece seal ring encircling said passageway and in engagement with the first end portion of said body member, said seal ring comprising:
a first end face engaging the entire first end face of said body member,
an axial flange on the first end face of said seal ring projecting into the passageway in said body member, said flange engaging said body member in said passageway, and
a second end face having a counterbore therein adjacent said passageway;
a seal portion on said one piece seal ring;
a valve ball having a port extending therethrough disposed in said passageway and in sealing engagement with said seal portion, said valve ball being rotatable in said passageway from a position aligning said port and passageway to a position wherein said port is disposed at a right angle relative to said passageway;
an operating member extending through said transverse opening into engagement with said valve ball for rotating said valve ball;
first flanged connecting means having an opening extending therethrough and having an axial flange encircling the opening therein and projecting into said counterbore in the second end face of said one piece seal ring, said axial flange of said first connecting means engaging said seal ring and fitting snugly in said counterbore and bearing against the walls of said counterbore to hold said first flanged connecting member, seal ring and body member assembled with said opening and passageway aligned;
second flanged connecting means having an opening extending therethrough, said second flanged connecting means having an end face engaging the second end face on said valve body means and having a surface thereon adjacent the end face thereof and coaxially arranged with respect to the opening through said second connecting means and engaging the surface adjacent the second end face of said valve body means to align the opening therein with said passageway; and
fastener means extending between said first and second flanged connecting means exerting a compressive force on said connecting means and valve body means, thereby retaining said connecting means and valve body means assembled with the openings in said first and second connecting means aligned with said passageway.

6. The ball valve of claim 5 wherein
said second end face on said body member includes an axial flange encircling said passageway; and, wherein
said second flanged connecting means has a counterbore in the end face thereof encircling the opening therein, said counterbore receiving the axial flange on the second end face of said body member to hold said body member and second flanged connecting means assembled with said opening and passageway aligned.

References Cited

UNITED STATES PATENTS

| | | | |
|---|---|---|---|
| 2,751,185 | 6/1956 | Shand | 251—315 XR |
| 2,895,496 | 7/1959 | Sanctuary | 251—151 XR |
| 3,056,576 | 10/1962 | Kulisek | 251—317 XR |
| 3,193,248 | 7/1965 | Lowrey | 251—315 |
| 3,202,175 | 8/1965 | Dumm | 137—494.2 |
| 3,323,542 | 6/1967 | Magos | 251— 151 XR |

FOREIGN PATENTS 122,368    9/1944    Australia.

WILLIAM F. O'DEA, *Primary Examiner.*

H. W. WEAKLEY, *Assistant Examiner.*